United States Patent
Kirchmaier et al.

(10) Patent No.: US 11,499,466 B2
(45) Date of Patent: Nov. 15, 2022

(54) METHOD OF ROUTE IDENTIFICATION CONDUCIVE FOR SUCCESSFUL DIAGNOSIS OF AN EXHAUST GAS TREATMENT SYSTEM

(71) Applicants: Robert Bosch GmbH, Stuttgart (DE); Robert Bosch Engineering and Business Solutions Private Limited, Karnataka (IN)

(72) Inventors: Christof Kirchmaier, Ludwigsburg (DE); Dhaval Ketanbhai Dhruv, Gujarat (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 0 days.

(21) Appl. No.: 17/651,797

(22) Filed: Feb. 19, 2022

(65) Prior Publication Data
US 2022/0307405 A1 Sep. 29, 2022

(30) Foreign Application Priority Data
Feb. 22, 2021 (IN) .............................. 202141007476

(51) Int. Cl.
*F01N 11/00* (2006.01)
*G01S 19/42* (2010.01)

(52) U.S. Cl.
CPC .............. *F01N 11/00* (2013.01); *G01S 19/42* (2013.01)

(58) Field of Classification Search
CPC .................................. F01N 11/00; G01S 19/42
See application file for complete search history.

(56) References Cited

U.S. PATENT DOCUMENTS

| | | | | |
|---|---|---|---|---|
| 7,987,667 B2* | 8/2011 | Meier | ................... | F01N 13/011 60/288 |
| 9,551,258 B2* | 1/2017 | Argolini | ................ | F02D 41/027 |
| 2012/0167555 A1* | 7/2012 | Frazier | .................... | F01N 9/002 60/274 |
| 2014/0019019 A1 | 1/2014 | Perbandt et al. | | |

* cited by examiner

*Primary Examiner* — Logan M Kraft
*Assistant Examiner* — Arnold Castro
(74) *Attorney, Agent, or Firm* — Maginot, Moore & Beck LLP

(57) ABSTRACT

A method is for route identification that is conducive for successful diagnosis of an exhaust gas treatment system of a vehicle. In the method, an ECU in the vehicle receives a value of GPS coordinates from a GPS module, and the ECU retrieves a value of day, date, and time from an ECU clock. The ECU monitors a value of engine operating conditions with reference to the received value of GPS coordinates and the retrieved value of day, date, and time. The ECU identifies a segment of GPS coordinates for successful diagnosis of an exhaust gas treatment system based on the monitored value. Upon the identification, the segment of GPS coordinates is stored in ECU memory.

8 Claims, 2 Drawing Sheets

METHOD OF ROUTE IDENTIFICATION CONDUCIVE FOR SUCCESSFUL DIAGNOSIS OF AN EXHAUST GAS TREATMENT SYSTEM

This application claims priority under 35 U.S.C. § 119 to patent application no. IN 202141007476, filed on Feb. 22, 2021 in India, the disclosure of which is incorporated herein by reference in its entirety.

FIELD

The disclosure relates to a method of route identification conducive for successful diagnosis of an exhaust gas treatment system.

BACKGROUND

Exhaust gas system used in combustion driven vehicles are required to perform diagnostics of components for every drive cycle. One of the methods of on board system diagnostics of exhaust components is to actively change air/fuel ratio (hereafter referred as lambda) to lean and rich alternatively and evaluate the oxygen sensor signal characteristics. However these lambda changes for diagnosis purpose lead to high emissions temporarily. On other hand, this diagnosis runs only when certain operating conditions (e.g. steady state exhaust mass, engine speed, load, temperature, etc.) are sustained for certain time duration in which the diagnosis function starts and then concludes the results. Even if one of required conditions is lost before it concludes results, the diagnosis has to repeat from beginning. The diagnosis duration can be in terms of seconds (typically ~10 to 30 sec) which may be difficult to have without interruptions in high traffic cities and probability of diagnosis aborting is high, leading to more emission peaks. Hence there is a need for predicting routes or segments that would be conducive to perform system diagnosis of the exhaust gas system. Conventional methods make use of live navigation data from the internet or cloud based services to predict route segments favorable for this diagnosis.

Patent Application US20140019019 titled "Method for monitoring components of a motor vehicle and motor vehicle with corresponding monitoring device" discloses a method for monitoring a functionality of a first and a second component of a motor vehicle the requirements for the monitoring are as follows: for a valid monitoring of the first component a predetermined operating condition of the motor vehicle must exist; for a valid monitoring of the second component the first component must be functioning properly. According to the method according to the disclosure, upon impending travel, taking into account navigation data of a navigation assistance system, it is determined whether the prescribed operating condition is expected to exist.

BRIEF DESCRIPTION OF THE DRAWINGS

An embodiment of the disclosure is described with reference to the following accompanying drawings.

DETAILED DESCRIPTION

Figure 1:
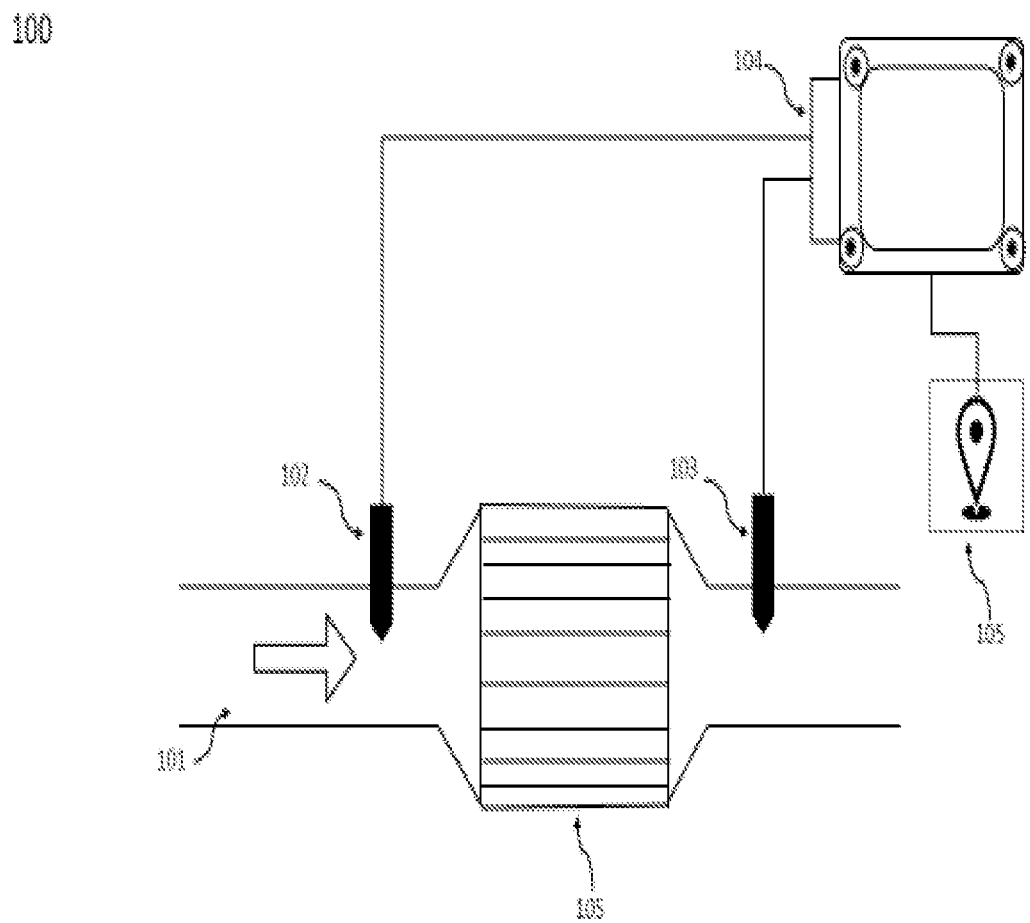
FIG. 1 depicts a layout of an exhaust gas treatment system (100) in accordance with an embodiment of this disclosure.

FIG. 1 depicts a layout of an exhaust gas treatment system (100) in accordance with an embodiment of this disclosure. The exhaust gas system comprises a catalytic converter (105), an oxygen sensor upstream (102) of the catalytic converter (105), an oxygen sensor downstream (103) of the catalytic converter (105) placed in the exhaust gas path (101). An Engine electronic control unit (ECU (104)) is in communication with at least the oxygen sensor upstream (102) of the catalytic converter (105) and the oxygen sensor downstream (103) of the catalytic converter (105). A person skilled in the art will appreciate that the ECU (104) in convention exhaust gas systems is also in communication with the other components such as temperature sensors and delta pressure sensor and the like. In accordance with an embodiment of the disclosure the ECU (104) is in communication with a Global Positioning System (GPS) module in the vehicle.

The method of diagnostics of exhaust components involves actively changing air/fuel ratio (hereafter referred as lambda) to lean and rich alternatively and evaluate the oxygen sensor signal characteristics. These lambda changes for diagnosis purpose lead to emission peaks. On other hand, this diagnosis requires certain operating conditions (e.g. steady state exhaust mass, engine speed, load, temperature, etc.) to be sustained for certain time duration in which the diagnosis function start and then conclude the results. Even one of required conditions is lost before it concludes results, the diagnosis has to repeat from beginning. The diagnosis duration can be in terms of seconds (typically ~10 ... 30 sec) which may be difficult to have without interruptions in high traffic cities and probability of diagnosis aborting is high, leading to more emission peaks.

Figure 2:
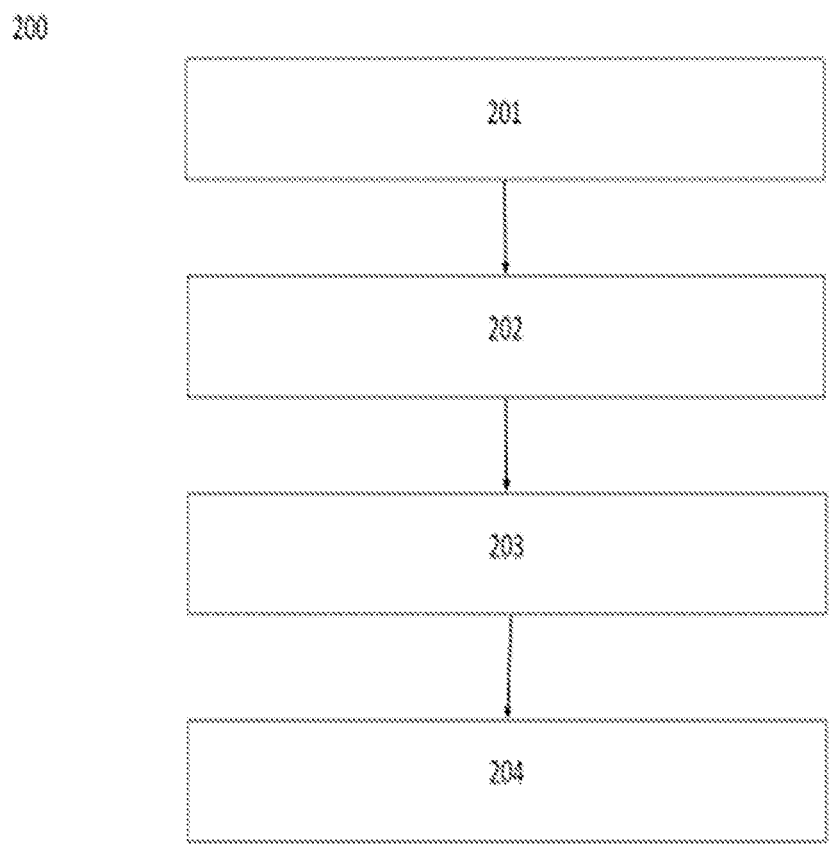
FIG. 2 depicts method steps (200) of route identification conducive for successful diagnosis of an exhaust gas treatment system.

FIG. 2 depicts method steps (200) of route identification conducive for successful diagnosis of an exhaust gas treatment system as described in accordance with FIG. 1. The vehicle comprising at least an Electronic Control Unit (ECU (104)) in communication with components of the exhaust gas treatment system, the ECU (104) in communication with a global positioning system (GPS), the ECU (104) comprising a processing unit and at least a memory. In step 201, the ECU (104) receives a value of GPS coordinates from the GPS module (106). This is a continuous process initiated in every vehicle drive cycle. In step 202 the ECU (104) retrieves a value of day, date and time from an ECU (104) clock. The retrieved value is recorded corresponding to the received GPS coordinates.

In step 203, the ECU (104) monitors a value of engine operating conditions with reference to the value of GPS coordinates and value of day, date and time. The engine operating parameters comprise but are not limited to the following steady state exhaust mass, engine speed, engine load and at least an engine temperature. For example the conditions at which route segments are monitored to be extracted are: vehicle speed is stable and within defined band, engine speed and load are also stable and within defined band, exhaust gas catalyst temperature is not fluctuating and within defined temperature window, and no overrun condition identified.

In method step 203, the ECU (104) identifies a segment of GPS coordinates for successful diagnosis of an exhaust gas treatment system based on the monitored value. The identification of a segment of GPS coordinates comprises comparing the instantaneous engine operating parameters with a pre-determined value of engine operating parameters favorable for successful diagnosis of an exhaust gas treatment system. For example for a particular exhaust gas system a pre-determined value of engine operating parameters favorable for successful diagnosis can be vehicle speed steady in range à 30 kmph to 70 kmph, engine speed steady in range à 2000 rpm to 4000 rpm, engine load steady in range à 30% to 70%, exhaust gas catalyst temperature steady in range à 400 degree C. to 600 degree C. The set or segment of coordinates wherein these conditions were fulfilled are identified and extracted as a segment of a route favorable for successful diagnosis. Upon identification, the segment of GPS coordinates are stored in ECU (104) memory.

After regular routes and their suitable route segments for diagnosis are learnt over certain number of driving cycles, they are further stored for prediction algorithm and re-learnt over driving cycles based on actual success rate of prediction algorithm. Every suitable route segment of learnt route is assigned with prediction probability, i.e. the probability of finishing the diagnosis in the route segment. Based on this probability values, the ECU (104) can decide if lambda modulation for diagnosis should be triggered or not.

The ECU (104) depicted in FIG. 1 is adapted to learn a route for successful diagnosis of an exhaust gas treatment system. The ECU (104) comprises a processing unit and at least a memory. In an embodiment of the disclosure the processor runs an artificial intelligences based model. The ECU (104) configured to: receive a value of GPS coordinates from the GPS module (106); retrieve a value of day and time from an ECU (104) clock; monitor a value of a value of engine operating conditions with reference to the value of GPS coordinates and value of day and time; identify a segment of GPS coordinates for successful diagnosis of an exhaust gas treatment system based on the monitored value; store the segment of GPS coordinates in memory. A person skilled in the art will appreciate that while these methodologies describes only a series of steps to accomplish the objectives, these methodologies may be implemented in a vehicle inside the ECU (104) software or by a cloud or a combination thereof.

This idea to develop a method of route identification conducive for successful diagnosis of an exhaust gas treatment system helps identifying and learning route segments of enough time duration where diagnosis can be finished without interruptions. This route learning based predictive enabling of diagnosis helps in reducing real driving emissions in high traffic cities where it would be difficult to sustain enabling conditions for required timespan.

It must be understood that the embodiments explained in the above detailed description are only illustrative and do not limit the scope of this disclosure. Any modification to the method of route identification conducive for successful diagnosis of an exhaust gas treatment system are envisaged and form a part of this disclosure. The scope of this disclosure is limited only by the claims.

What is claimed is:

1. A method of route identification conducive for successful diagnosis of an exhaust gas treatment system in a vehicle, the vehicle comprising at least an Electronic Control Unit (ECU) in communication with components of the exhaust gas treatment system, the ECU in communication with a global positioning system (GPS), the ECU comprising a processing unit and a memory, the method comprising:
   receiving a value of GPS coordinates from a GPS module;
   retrieving a value of day, date, and time from a clock of the ECU;
   monitoring a value of engine operating conditions with reference to the received value of GPS coordinates and the retrieved value of day, date, and time; and
   identifying a segment of GPS coordinates for the successful diagnosis of the exhaust gas treatment system based on the monitored value.

2. The method of route identification as claimed in claim 1, wherein the engine operating conditions comprise at least steady state exhaust mass, engine speed, engine load, and engine temperature.

3. The method of route identification as claimed in claim 1 wherein the identification of the segment of GPS coordinates comprises:
   comparing instantaneous engine operating conditions with a pre-determined value of the engine operating conditions favorable for the successful diagnosis of the exhaust gas treatment system.

4. The method of route identification as claimed in claim 1 further comprising:
   storing the identified segment of GPS coordinates in a memory of the ECU.

5. An electronic control unit (ECU) configured to learn a route for successful diagnosis of an exhaust gas treatment system in a vehicle, comprising:
   a processing unit;
   a clock operably connected to the processing unit; and
   a memory operably connected to the processing unit,
   wherein the ECU is in communication with components of the exhaust gas treatment system,
   wherein the ECU is in communication with a global positioning system (GPS),
   wherein the ECU is configured to:
     receive a value of GPS coordinates from a GPS module,
     retrieve a value of day and time from the clock,
     monitor a value of engine operating conditions with reference to the received value of GPS coordinates and the retrieved value of day and time,
     identify a segment of GPS coordinates for the successful diagnosis of the exhaust gas treatment system based on the monitored value, and
     store the segment of GPS coordinates in the memory.

6. The ECU as claimed in claim 5, wherein the processor is configured to run an artificial intelligences based model.

7. The ECU as claimed in claim 5, wherein the engine operating conditions comprise at least one of steady state exhaust mass, engine speed, engine load, and engine temperature.

8. The ECU as claimed in claim 5, wherein the identification of the segment of GPS coordinates comprises:
   comparing instantaneous engine operating conditions with a pre-determined value of engine operating conditions favorable for the successful diagnosis of the exhaust gas treatment system.

* * * * *